United States Patent
Moriyama (10) Patent No.: US 9,205,857 B2
(45) Date of Patent: Dec. 8, 2015

(54) STEERING APPARATUS (75) Inventor: Seiichi Moriyama, Gunma-ken (JP)

(73) Assignee: NSK Ltd., Tokyo (JP)

( * ) Notice: Subject to any disclaimer, the term of this patent is extended or adjusted under 35 U.S.C. 154(b) by 175 days.

(21) Appl. No.: 13/810,287

(22) PCT Filed: Aug. 9, 2012

(86) PCT No.: PCT/JP2012/070306
§ 371 (c)(1),
(2), (4) Date: Jan. 15, 2013

(87) PCT Pub. No.: WO2013/042480
PCT Pub. Date: Mar. 28, 2013

(65) Prior Publication Data
US 2013/0133463 A1 May 30, 2013

(30) Foreign Application Priority Data

Sep. 20, 2011 (JP) .................................. 2011-204354

(51) Int. Cl.
*B62D 1/18* (2006.01)
*B62D 1/184* (2006.01)
*B62D 1/19* (2006.01)

(52) U.S. Cl.
CPC *B62D 1/184* (2013.01); *B62D 1/18* (2013.01); *B62D 1/195* (2013.01)

(58) Field of Classification Search
USPC .................................... 280/775, 779; 74/493
IPC ........................................... B62D 1/184,1/195
See application file for complete search history.

(56) References Cited

U.S. PATENT DOCUMENTS

| 6,095,012 A | 8/2000 | Lutz | |
|---|---|---|---|
| 2004/0134301 A1* | 7/2004 | Ko et al. | 74/492 |
| 2007/0068311 A1* | 3/2007 | Shimoda et al. | 74/493 |
| 2008/0087129 A1* | 4/2008 | Kaneko et al. | 74/493 |

FOREIGN PATENT DOCUMENTS

| JP | 10-35511 A | 2/1998 |
|---|---|---|
| JP | 2009-29223 A | 2/2009 |
| JP | 2009-29224 A | 2/2009 |
| JP | 2010-126142 A | 6/2010 |
| JP | 2013256193 A * | 12/2013 |

OTHER PUBLICATIONS

English translation of International Preliminary Report on Patentability from International Patent Application No. PCT/JP2012/070306, mailed Apr. 3, 2014.

* cited by examiner

*Primary Examiner* — Faye M Fleming
(74) *Attorney, Agent, or Firm* — Miles & Stockbridge P.C.

(57) ABSTRACT

A steering apparatus mounted on a vehicle is small both in dimension in a vehicle widthwise direction and in number of components, the steering apparatus is hard to move a column when a secondary collision occurs and easy to design an impact absorbing mechanism. The steering apparatus is therefore provided with a first rock friction plate 51 and a second rock friction plate 52 to increase frictional faces counteracting an impact force when the secondary collision occurs, thereby augmenting a force of fixing an outer column 11.

5 Claims, 9 Drawing Sheets

STEERING APPARATUS

TECHNICAL FIELD

The present invention relates generally to a steering apparatus, and more particularly to a steering apparatus capable of adjusting a tilt position and a telescopic position of a steering wheel in a way that corresponds to a physical constitution and a driving position of a driver.

BACKGROUND ART

There is a steering apparatus enabling positions in up-and-down directions or back-and-forth directions of the steering wheel to be adjusted corresponding to the physical constitution and the driving position of the driver. This type of steering apparatus is configured so that after completing an adjustment of a tilt position or a telescopic position, a driver operates an operation lever, consequently a fastening rod fastens a column together with side plates of a vehicle body fitting bracket, and the column is thus fixed so as to be disabled from making a tilt or telescopic movement. Further, the vehicle body fitting bracket is constructed to, when a predetermined impact load is applied thereto, remove from a vehicle body, to then move towards a front side of the vehicle body and to relax the impact load applied to the driver.

In the steering apparatus such as this, if the force of fixing the column is small, upon the secondary collision at which the driver collides with a steering wheel, before the vehicle body fitting bracket gets removed from the vehicle body, the impact load is apt to cause the column to be moved upward, or an outer column 11 to be moved forward in some cases. This being the case, caused by the secondary collision, there occurs a dispersion in load in a collapse direction due to the secondary collision such as a reduction in load applied to the steering wheel 12 in the collapse direction, resulting in difficulty in designing an impact absorbing mechanism.

Accordingly, an apparatus configured to fix the column to the vehicle body fitting bracket is requested to have rigidity when fixed and stabilize the fixing force. Moreover, the apparatus is also requested to facilitate an unclamping operation by taking convenience of the driver into consideration. Such being the case, as disclosed in Patent document 1, a structure is adopted, in which the side plates of the vehicle body fitting bracket and the column are fastened via friction plates in some instances.

The clamp apparatus using such friction plates is, as disclosed in Patent document 1, that tilt friction plates each formed long in a tilt adjustment direction is fixed to the vehicle body fitting bracket, telescopic friction plates each formed long in a telescopic adjustment direction is fixed to the column, and washers are interposed between the respective friction plates to increase the number of friction faces, thereby augmenting the friction force. According to this apparatus, the washers interposed between the respective friction plates lead to increase in dimension of the steering apparatus in the vehicle widthwise direction, in number of components, and in weight of the steering apparatus.

DOCUMENT OF PRIOR ART

Patent Document

Patent document 1: Japanese Patent Application Laid-Open No. 1998-35511

SUMMARY OF THE INVENTION

Problems to be Solved by the Invention

It is an object of the present invention to provide a steering apparatus that is small both in dimension in a vehicle widthwise direction and in number of components, hard to move a column when a secondary collision occurs and easy to design an impact absorbing mechanism.

Means for Solving the Problems

The problems given above are solved by the following means. Namely, a steering apparatus includes: a column supported in the way of being enabled to make a tilt adjustment and supporting a steering shaft rotatably; a vehicle body fitting bracket having a pair of side plates disposed to sandwich the column in therebetween from both sides in a vehicle widthwise direction; a first rock friction plate brought into surface-contact with the side plate and supported by the side plate in a rockable manner; and a second rock friction plate brought into surface-contact with the first rock friction plate and supported by the first rock friction plate rotatably, wherein the column is formed with a through-hole in the vehicle widthwise direction, the side plate is formed with a tilt adjustment elongate groove extending in a tilt adjusting direction in a way that corresponds to the through-hole, the first rock friction plate is formed with a first elongate groove corresponding to the through-hole, the second rock friction plate is formed with a second elongate groove corresponding to the through-hole, a fastening rod is provided, which is inserted through the second elongate groove, the tilt adjustment elongate groove, the first elongate groove and the second elongate groove to fasten the column, the pair of side plates, the first rock friction plate and the second rock friction plate, and the first rock friction plate and the second rock friction plate rock to allow the fastening rod to move when the tilt adjustment is conducted by releasing the fastening of the fastening rod.

According to a second invention, the steering apparatus is provided, wherein the column is supported in the way of being enabled to make a telescopic adjustment, the through-hole is formed long in a telescopic direction, a third rock friction plate is provided, which is brought into surface-contact with the side plate and the column between the side plate and the column and is supported by the column rotatably, the third rock friction plate is formed with a third elongate groove corresponding to the through-hole, the fastening rod is inserted through the third elongate groove, the third rock friction plate is fastened by the fastening rod together with the column, the pair of side plates, the first rock friction plate and the second rock friction plate, and the third rock friction plate rocks to avoid interference with the fastening rod when the telescopic adjustment is conducted by releasing the fastening of the fastening rod.

According to a third invention, there is provided a steering apparatus which includes: a column supported in the way of being enabled to make a telescopic adjustment and supporting a steering shaft rotatably; a vehicle body fitting bracket having a pair of side plates disposed to sandwich the column in therebetween from both sides in a vehicle widthwise direction; a first rock friction plate brought into surface-contact with the column between the side plate and the column and supported by the column in a rockable manner; and a second rock friction plate brought into surface-contact with the first rock friction plate and the side plate between the first rock friction plate and the side plate and supported by the first rock friction plate rotatably, wherein the column is formed with elongate holes in the vehicle widthwise direction, the elongate holes are extending in a telescopic adjustment direction, the pair of side plates are formed with through-holes corresponding to the elongate holes, respectively, the first rock friction plate is formed with a first elongate groove corresponding to the elongate hole, the second rock friction plate is formed with a second elongate groove corresponding to the elongate hole, a fastening rod is provided, which is inserted through the elongate hole, the through-hole, the first elongate groove and the second elongate groove to fasten the column, the pair of side plates, the first rock friction plate and the second rock friction plate, and the first rock friction plate and the second rock friction plate rock to avoid interference with the fastening rod when the telescopic adjustment is conducted by releasing the fastening of the fastening rod.

According to a fourth invention, the steering apparatus is provided wherein the column is supported in the way of being enabled to make the tilt adjustment, the through-hole extends in the tilt adjusting direction, a third rock friction plate is provided, which is brought into surface-contact with the side plate and supported by the side plate rotatably, a fourth rock friction plate is provided, which is brought into surface-contact with the third rock friction plate and supported by the third rock friction plate rotatably, the third rock friction plate is formed with a third elongate groove corresponding to the through-hole, the fourth rock friction plate is formed with a fourth elongate groove corresponding to the through-hole, the fastening rod is inserted through the third elongate groove and the fourth elongate groove, the third rock friction plate and the fourth rock friction plate are fastened by the fastening rod together with the column, the pair of side plates, the first rock friction plate and the second rock friction plate, and the third rock friction plate and the fourth rock friction plate rock to avoid interference with the fastening rod when the tilt adjustment is conducted by releasing the fastening of the fastening rod.

According to a fifth invention, the steering apparatus is provided, wherein the column is supported in the way of being enabled to make the tilt adjustment, the through-hole extends in the tilt adjusting direction, a third rock friction plate is provided, which is brought into surface-contact with the side plate and supported by the side plate rotatably, the third rock friction plate is formed with a third elongate groove corresponding to the through-hole, the fastening rod is inserted through the third elongate groove, the third rock friction plate is fastened by the fastening rod together with the column, the pair of side plates, the first rock friction plate and the second rock friction plate, and the third rock friction plate rocks to allow the fastening rod to move when the tilt adjustment is conducted by releasing the fastening of the fastening rod.

Effect of the Invention

The fixing force of the column is improved, the column is hard to move in the tilt adjusting direction or the telescopic direction when the secondary collision occurs, the load applied to the vehicle body fitting bracket is stabilized when the secondary collision occurs, and a design of an impact absorbing mechanism is facilitated.

With this contrivance, the steering apparatus is smoothly removed from the vehicle body by dint of a predetermined impact force, and hence, when the secondary collision occurs, an impact exerted on the driver can be reduced.

Further, there is no necessity of interposing the washer, so that a dimension of the steering apparatus in the vehicle widthwise direction can be decreased, the number of components is reduced, and a weight of the steering apparatus decreases, which contribute to a reduction in manufacturing cost, an improvement of fuel consumption of the vehicle and an improvement of traveling performance of the vehicle.

MODE FOR CARRYING OUT THE INVENTION

A first embodiment and a second embodiment of the present invention will hereinafter be described based on the drawings.

First Embodiment

Figure 1:
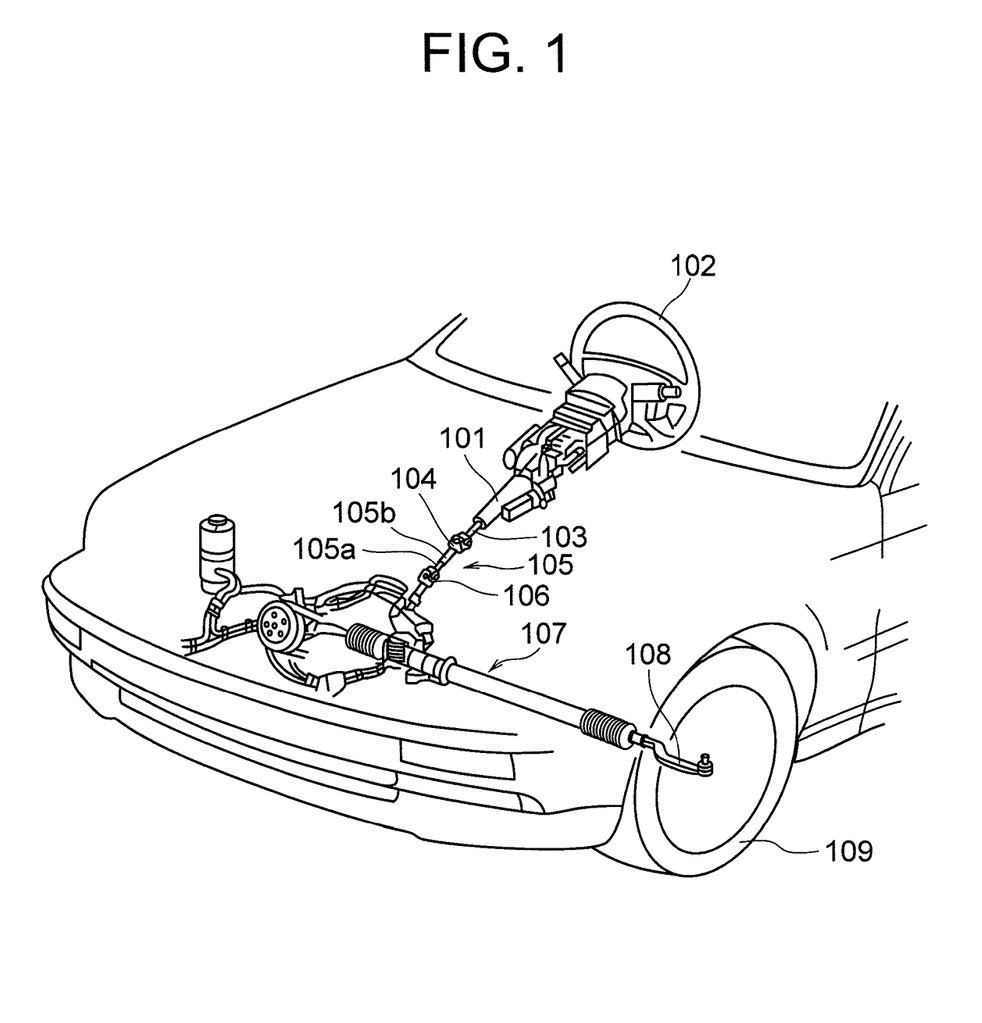
FIG. 1 is a whole perspective view illustrating a state where a steering apparatus in an embodiment of the present invention is mounted on a vehicle.

FIG. 1 is a perspective view illustrating a state where a steering apparatus of the present invention is mounted on a vehicle. As depicted in FIG. 1, a cylindrical column 101 is fitted to a vehicle body, and a steering shaft 103 is rotatably supported in this column 101. A steering wheel 102 is fitted to a portion of the steering shaft 103 on a rear side of the vehicle body, and an intermediate shaft 105 is joined via a universal joint 104 to a portion of the steering shaft 103 on a front side of the vehicle body.

The intermediate shaft 105 is constructed to include an intermediate inner shaft 105a formed with a male spline and a cylindrical intermediate outer shaft 105b formed with a female spline. The male spline of the intermediate inner shaft 105a engages with the female spline of the intermediate outer shaft 105b in the way of enabling rotary torque to be transferred therebetween and being slidable from each other in an axial direction, thus configuring the intermediate shaft 105 so as to be capable of stretching and contracting (telescopic motion).

Further, a portion of the intermediate outer shaft 105b on the rear side is jointed to the universal joint 104, and a portion of the intermediate inner shaft 105a on the front side is joined to a universal joint 106. A pinion meshing with an unillustrated rack of a steering gear assembly 107 is joined to the universal joint 106.

When the driver rotationally operates the steering wheel 102, a rotary force thereof is transferred to the steering gear assembly 107 via the universal joint 104, the intermediate shaft 105 and the universal joint 106, and a tie rod 108 is thereby moved through a rack-and-pinion mechanism, thus changing a turning angle of steering traveling wheels 109.

Figure 2:
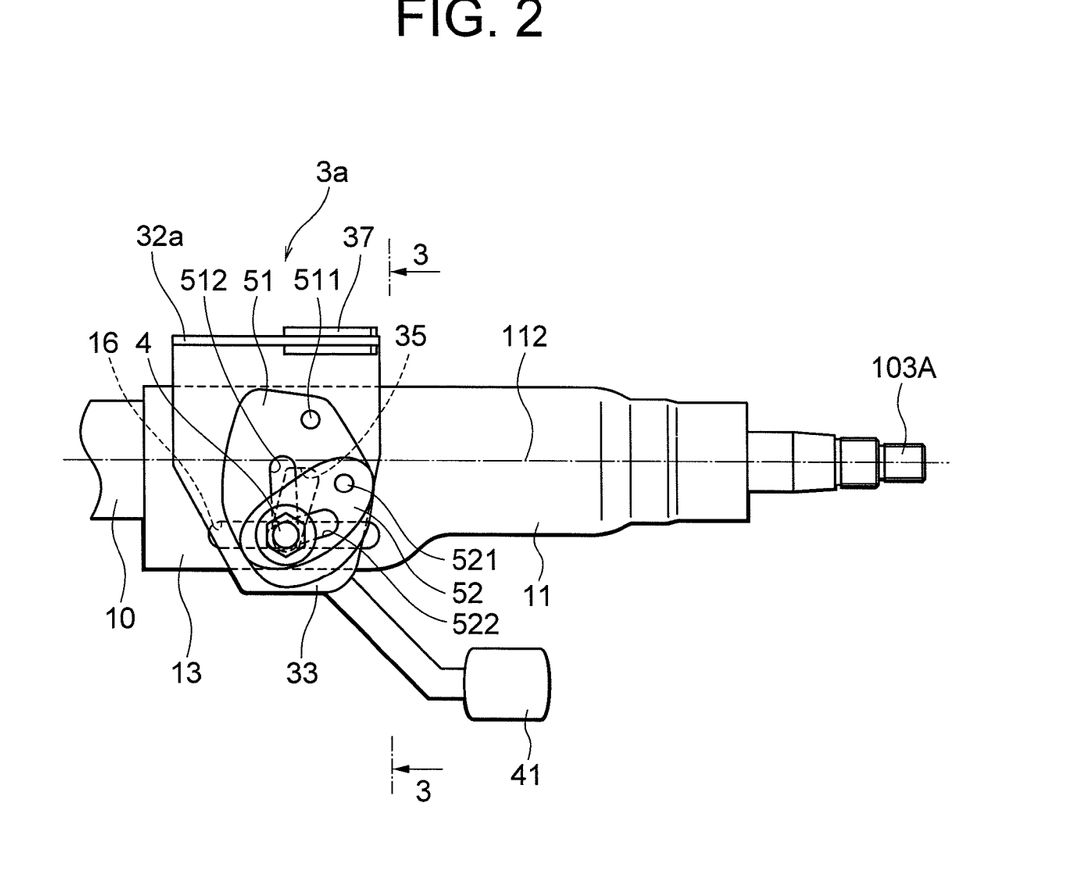
FIG. 2 is a side view illustrating a principal portion of the steering apparatus according to a first embodiment of the present invention.
Figure 3:
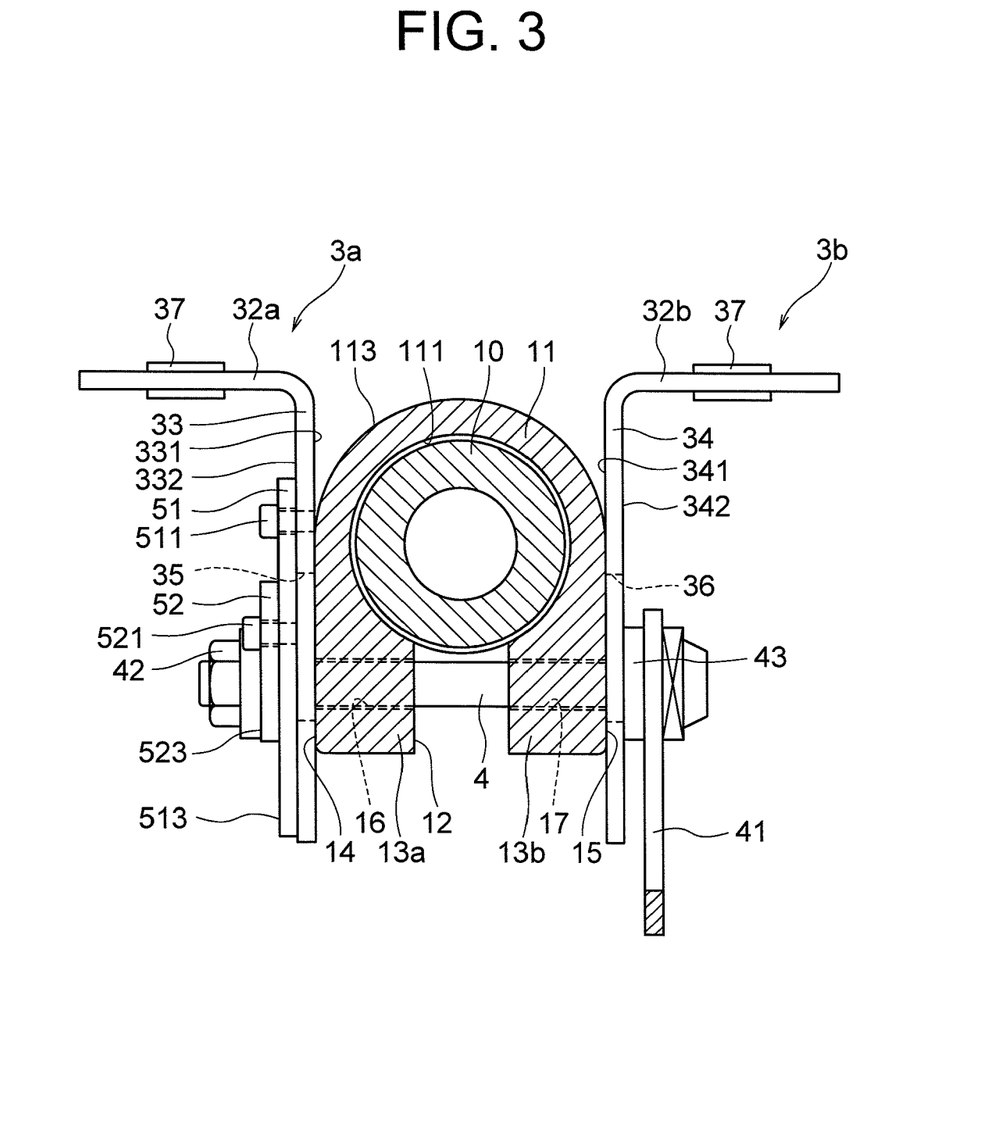
FIG. 3 is a sectional view taken along the 3-3 line depicted in FIG. 2.
Figure 4:
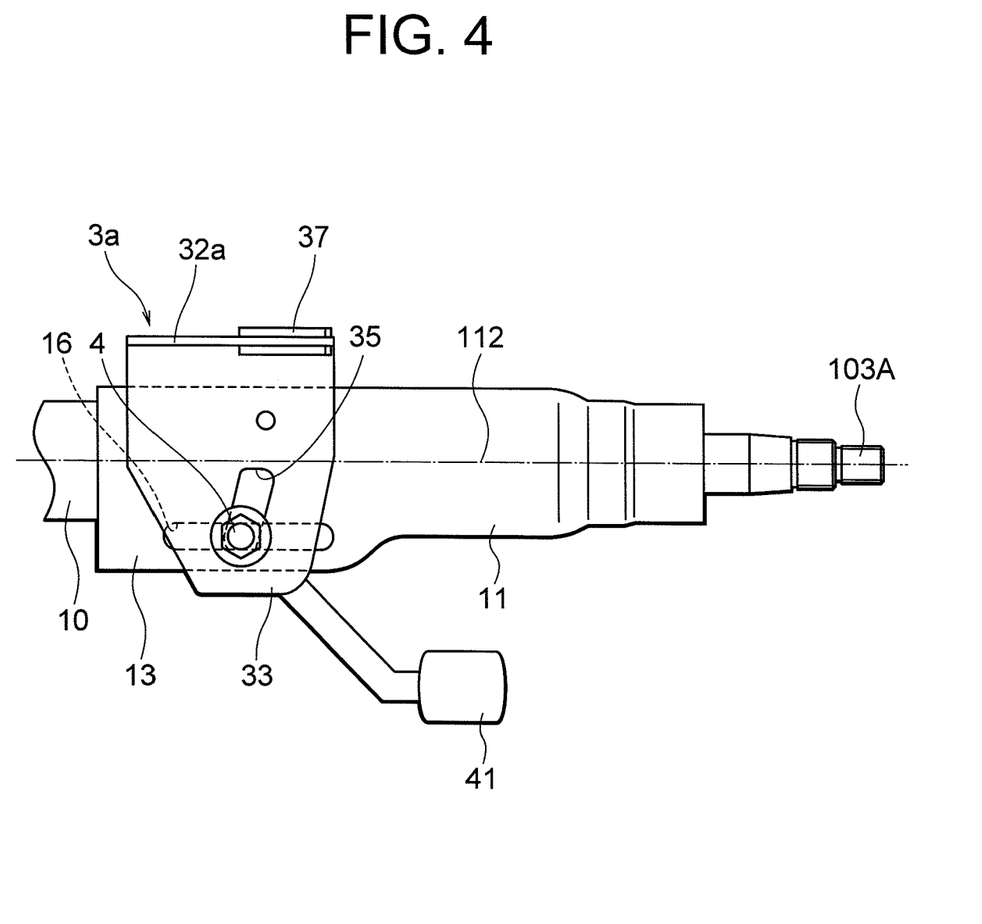
FIG. 4 is a side view illustrating a principal portion in a state where a first rock friction plate and a second rock friction plate are removed from vehicle body fitting brackets in FIG. 2.
Figure 5A:
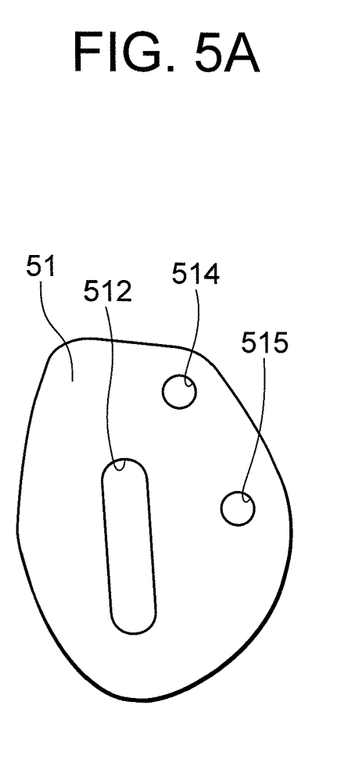
FIG. 5A is a plan view of the first rock friction plate.
Figure 5B:
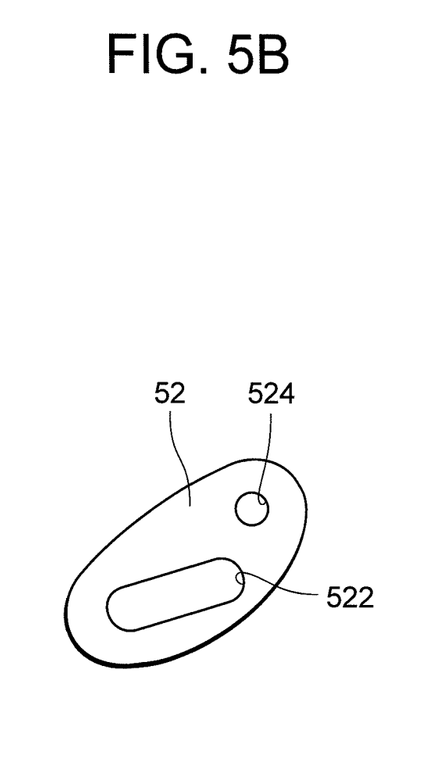
FIG. 5B is a plan view of the second rock friction plate.
Figure 6:
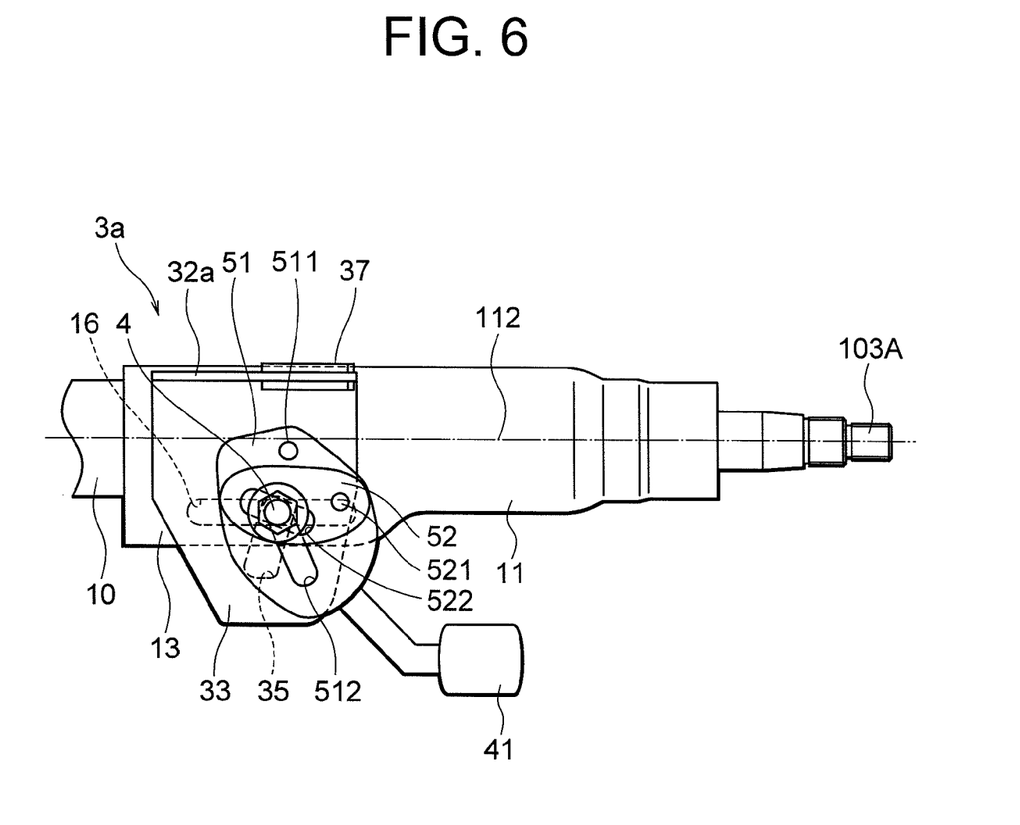
FIG. 6 is a side view illustrating a principal portion in a state where an outer column is moved up to a moving end on an upper side of a vehicle body in a tilt adjusting direction.
Figure 7:
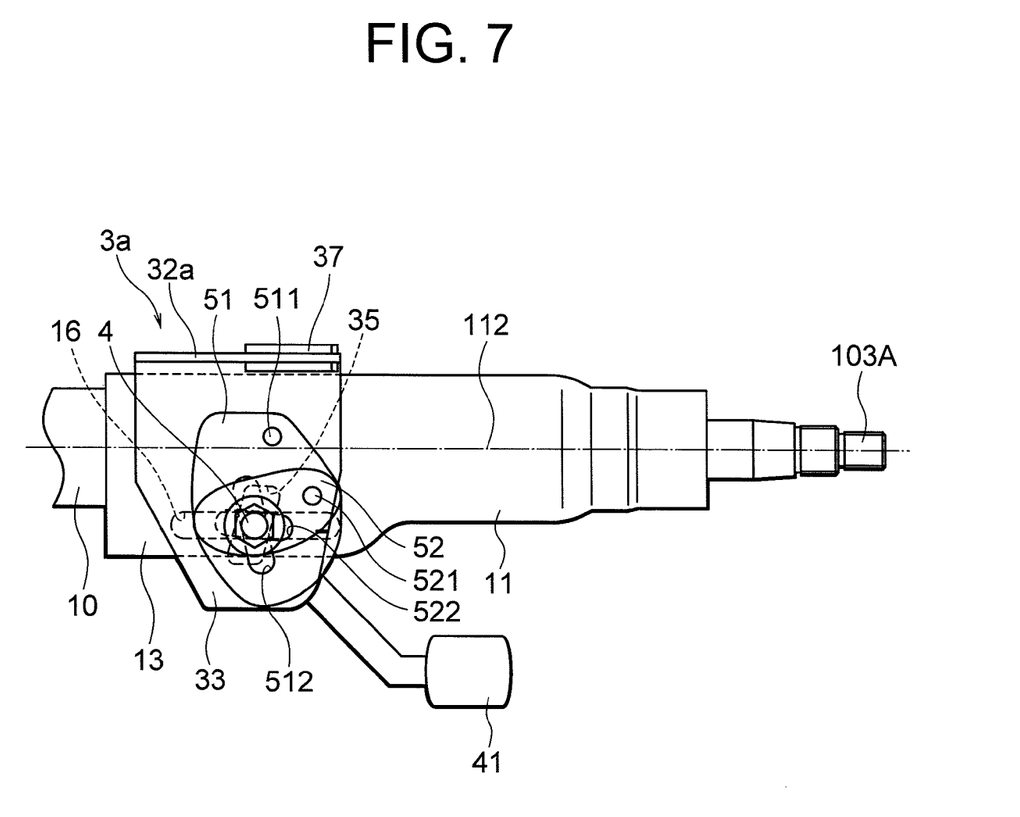
FIG. 7 is a side view illustrating the principal portion in a state where the outer column is moved up to an intermediate position in the tilt adjusting direction.

FIG. 2 is a side view illustrating a principal portion of the steering apparatus according to the first embodiment of the present invention; FIG. 3 is a sectional view taken along the 3-3 line depicted in FIG. 2; and FIG. 4 is a side view illustrating a principal portion in a state where a first rock friction plate and a second rock friction plate are removed from a vehicle body fitting bracket in FIG. 2. FIG. 5A is a plan view of the first rock friction plate; and FIG. 5B is a plan view of the second rock friction plate. FIG. 6 is a side view illustrating a principal portion in a state where an outer column is moved up to a moving end on an upper side of the vehicle body in a tilt adjusting direction; and FIG. 7 is a side view of the principal portion, depicting a state where the outer column is moved up to an intermediate position in the tilt adjusting direction.

As illustrated in FIGS. 2 to 7, an outer column 11 is fitted slidably in the axial direction on an outer periphery of an inner column 10 disposed on the front side. An upper steering shaft 103A is rotatably supported in the outer column 11, and the steering wheel 102 in FIG. 1 is fixed to an end portion of the upper steering shaft 103A on the rear side. In the embodiment of the present invention, the outer column 11 is an integrally molded product made by aluminum die-casting and may also be a product of a steel pipe to which a distance bracket is molded. Further, the outer column 11 may also be made by magnesium die-casting for the purpose of reducing a weight.

A pair of vehicle body fitting brackets 3a, 3b is disposed at a portion of the outer column 11 on the front side with the outer column 11 being sandwiched in between the brackets 3a, 3b from both sides of the vehicle body in right-and-left directions. The vehicle body fitting brackets 3a, 3b are fitted to the vehicle body through capsules 37 made of an aluminum alloy etc.

In case the driver collides with the steering wheel 102 upon a secondary collision with the result that a large impact acts thereon, the vehicle body fitting brackets 3a, 3b get removed forward from the capsules 37, and the outer column 11 is guided by the inner column 10 and thus moved toward the front side, thereby relaxing the impact exerted on the driver.

When the steering apparatus according to the first embodiment is assembled on the vehicle body to be mounted thereon, the portion of the inner column 10 on the front side is supported in a tiltable manner on the vehicle body through an unillustrated pivotal pin. A lower steering shaft is rotatably supported in the inner column 10, and a portion of the lower steering shaft on the rear side is spline-engaged with a portion of the upper steering shaft 103A on the front side. The lower steering shaft is joined to the intermediate shaft 105, and the intermediate shaft 105 is joined to the steering gear assembly 107.

As illustrated in FIG. 3, the vehicle body fitting brackets 3a, 3b include upper plates 32a, 32b and side plates 33, 34 extending downward from internal end portions of the upper plates 32a, 32b. The outer column 11 is formed integrally with a pair of distance brackets 13a, 13b projecting downwardly of the outer column 11. Side faces 14, 15 on the external sides of the distance brackets 13a, 13b abut on internal side faces 331, 341 of the side plates 33, 34, and these abutting faces are brought into slide-contact with each other when making tilt/telescopic adjustments. A slit 12 communicating with an inner peripheral face 111 of the outer column 11 and extending in the axial direction is, as shown in FIG. 3, formed between the distance brackets 13a, 13b.

Elongate grooves 35, 36 are formed through the side plates 33, 34 of the vehicle body fitting brackets 3a, 3b for adjusting the tilt. The tilt adjustment elongate grooves 35, 36 are each formed in a circular arc with the pivotal pin being centered.

The distance brackets 13a, 13b are formed with telescopic adjustment elongate grooves 16, 17 extending in parallel with a central axial line 112 of the outer column 11 on a lower side of the vehicle body than the inner column 10 so that the grooves 16, 17 are formed through these distance brackets 13a, 13b in a vehicle widthwise direction. A fastening rod 4 taking a round-bar shape is inserted through the tilt adjustment elongate grooves 35, 36 and the telescopic adjustment elongate grooves 16, 17 from the right side in FIG. 3.

A first rock friction plate 51 is so supported as to be rockable about the pin 511 on an external face 332 of the side plate 33 of the vehicle body fitting bracket 3a. The pin 511 is disposed on a more upward side than an upper end of the tilt adjustment elongate groove 35. Further, a second rock friction plate 52 is so supported as to be rockable about a pin 521 on the external face 513 of the first rock friction plate 51. A nut 42 is screwed to the fastening rod 4 on the external side of the second rock friction plate 52, and the first rock friction plate 51 and the second rock friction plate 52 are sandwiched in between the side plate 33 of the vehicle body fitting bracket 3a and the nut 42 screwed to the fastening rod 4.

The first rock friction plate 51 is, as illustrated in FIGS. 2 and 5A, a thin plate taking substantially a rounded substantially pentagonal shape and is formed with a through-hole 514 through which the pin 511 passes and a through-hole 515 into which the pin 521 is press-fitted. Furthermore, the first rock friction plate 51 includes a first elongate groove 512 inclined forward with respect to a straight line which connects the pin 511 to the fastening rod 4. The first elongate groove 512 may be formed long along the straight line connecting the pin 511 to the fastening rod 4. The first elongate groove 512 is not limited to the linear shape but may take the circular arc shape.

Moreover, the second rock friction plate 52 is a smaller thin plate taking substantially an elliptical shape than the first rock friction plate 51 and is formed with a through-hole 524 through which the pin 521 passes. The first rock friction plate 51 and the second rock friction plate 52 take two-dimensional shapes allowing the entire surface of the second rock friction plate 52 to be kept in contact with the first rock friction plate 51 even when the first rock friction plate 51 and the second rock friction plate 52 make a rocking movement on the occasion of making the tilt adjustment that will be described later on. In the present invention, however, the first rock friction plate 51 and the second rock friction plate 52 are not limited to the flat surface shapes. The second rock friction plate 52 includes a second elongate groove 522 inclined on the rear side with respect to the straight line connecting the pin 521 to the fastening rod 4 in a tilt position shown in FIG. 2. The second elongate groove 522 may be formed long along the straight line connecting the pin 521 to the fastening rod 4. Further, the second elongate groove 522 is not limited to the linear shape but may take the circular arc shape. As in the first embodiment, the first elongate groove 512 and the second elongate groove 522 are configured to apply forces causing the first elongate groove 512 and the second elongate groove 522 make a rocking movement in directions opposite to each other when the secondary collision occurs, thereby making it possible to counteract an impact load effectively by the friction.

A cam 43 configured to include a fixed cam and a movable cam each taking an annular shape and brought into surface contact with each other and an operation lever 41 are fitted sequentially from the inside on a portion of the fastening rod 4 on the right side illustrated in FIG. 3. Further, a female screw formed in an inner diametrical portion of the nut 42 is screwed to a male screw formed in the vicinity of the end portion of the fastening rod 4 on the left side, and a right end face of the nut 42 abuts the external face 523 of the second rock friction plate 52.

The surfaces, having a face-to-face relation, of the fixed cam and the movable cam building up the cam 43 are formed with a plurality of projected portions disposed in a circumferential direction, thus providing a configuration enabling the fixed cam and the movable cam to mesh with each other. When the driver operates the operation lever 41, the movable cam rotates along the fixed cam. This rotation switches over a meshing state between the fixed cam and the movable cam to a non-meshing state, and vice versa. In the state where the fixed cam and the movable cam mesh with each other, the driver can make the tilt adjustment and the telescopic adjustment because the outer column 11 is not fixed, and, whereas in the state where the fixed cam and the movable cam do not mesh, the outer column 11 is fixed.

When the driver rotates the operation lever 41 in a predetermined direction from the meshing state of the cam 43, the inclined surface formed on the projected portions of the fixed cam and the inclined surface formed on the projected portions of the movable cam slide on each other, then the fixed cam and the movable cam move so as to get away from each other, and the projected portions of the movable cam run on the projected portions of the fixed cam. With this operation, a width of the cam 43 in the vehicle widthwise direction expands, and hence the side plate 34 is pushed by a left edge surface of the fixed cam toward the left side in FIG. 3 and gets deformed slightly inward, whereby the internal face 341 of the side plate 34 is pushed strong against a side face 15 of the distance bracket 13b. Simultaneously with this, the nut 42 is pulled by the fastening rod 4 toward the right side in FIG. 3, then the side plate 33 gets deformed slightly inward by pressing the external face 332 of the side plate 33 via the second rock friction plate 52 and the first rock friction plate 51, and the internal face 331 of the side plate 33 is pushed strong against the side face 14 of the distance bracket 13a. In the steering apparatus according to the first embodiment, the number of faces with the frictional forces counteracting the load caused when the secondary collision occurs is increased by providing the first rock friction plate 51 and the second rock friction plate 52, whereby the outer column 11 is firmly fixed to the vehicle body fitting brackets 3a, 3b. This configuration is particularly effective in the force in the tilt adjusting direction. For example, in the state illustrated in FIG. 2, if the secondary collision causes the force to push the outer column 11 upward, the fastening rod 4 is to move upward together with the outer column 11, however, a first elongate hole 512 and a second elongate hole 522 counteracts the movement of the fastening rod 4. The first rock friction plate 51 and the second rock friction plate 52 counteract the forces applied to the first elongate hole 512 and the second elongate hole 522 from the fastening rod 4 by dint of the frictional forces generated on both surfaces of each plate 51, 52.

Further, with the fastening force of the fastening rod 4, the side plates 33, 34 press the side faces 14, 15 of the distance brackets 13a, 13b, whereby the outer column 11 gets deformed, a width of the slit 12 of the outer column 11 becomes narrow, an inner peripheral face 111 of the outer column 11 reduces in diameter, the inner peripheral face 111 of the outer column 11 embraces the outer peripheral face of the inner column 10, and the outer column 11 is thus fixed so as to be disabled from moving relatively to the inner column 10. In the steering apparatus according to the first embodiment, the outer column 11 is firmly fixed to the vehicle body fitting brackets 3a, 3b and the inner column 10 in the way described above.

Next, when the driver rotates the operation lever 41 in the opposite direction from the state where the outer column 11 is fixed as described above, the fixed cam and the movable cam of the cam 43 mesh with each other and thus get close to each other, whereby the fastening of the fastening rod 4 is released, and the side plates 33, 34 of the vehicle body fitting brackets 3a, 3b resiliently return toward the outside, respectively.

With this operation, the outer column 11 comes to the state of being movable in the tilt adjusting direction. In this state, when the driver moves the steering wheel 102 in the tilt adjusting direction, the fastening rod 4 moves together with the outer column 11 along the tilt adjustment elongate grooves 35, 36.

When the fastening rod 4 moves along the tilt adjustment elongate grooves 35, 36, the first elongate groove 512 and the second elongate groove 522 are pushed by the fastening rod 4, and the first rock friction plate 51 and the second rock friction plate 52 rotate about the pin 511 and the pin 522 in the back-and-forth directions, thereby allowing the fastening rod 4 to move. The driver is thereby enabled to adjust the position of the steering wheel 102 in the tilt adjusting direction by lightly operating the handle.

Further, the inner peripheral face 111 of the outer column 11, which remains reduced in diameter, increases in diameter by releasing the fastening, thereby enabling the outer column 11 and the inner column 10 to move relatively. Through this operation, the driver can make the telescopic adjustment as well as make the tilt adjustment of the steering wheel 102. Note that in the case of making only the telescopic adjustment, the fastening rod 4, the first rock friction plate 51 and the second rock friction plate 52 do not move, while the outer column 11, the upper steering shaft 103A and the steering wheel 102 move.

Based on the configuration described above, in the steering apparatus according to the first embodiment, the outer column is firmly fixed, thereby stabilizing the load in the collapse direction when the secondary collision occurs and facilitating a design of an impact absorbing mechanism. Moreover, the vehicle body fitting brackets 3a, 3b are smoothly removed from the vehicle body by dint of a predetermined collapse load, impact absorbing performance is stabilized, and the impact exerted on the driver when the secondary collision occurs can be reduced. Furthermore, there is no necessity of interposing a washer between the first rock friction plate 51 and the second rock friction plate 52, so that a dimension of the steering apparatus in the vehicle widthwise direction can be decreased, the number of components is reduced, and a weight of the steering apparatus decreases, which contributes to a reduction in manufacturing cost, an improvement of fuel consumption of the vehicle and an improvement of traveling performance of the vehicle.

Note that the first rock friction plate 51 and the second rock friction plate 52 may also be provided between the side plate 34 of the vehicle body fitting bracket 3b and the cam 43. Further, the first rock friction plate 51 and the second rock friction plate 52 may also be provided both between the side plate 33 and the nut 42 and between the side plate 34 and the cam 43. Moreover, the first rock friction plate 51 and the second rock friction plate 52 may also be disposed between the side plate 33 and the distance bracket 13a or between the side plate 34 and the distance bracket 13b or alternatively disposed both between these components and therebetween, while the first rock friction plate 51 may be fitted to the side plate 33 or 34 rotatably.

It is to be noted that the steering apparatus according to the first embodiment involves taking a 2-plate configuration of the first rock friction plate 51 and the second rock friction plate 52, however, the present invention may take a 3-plate configuration including an addition of a third rock friction plate supported on the external face 523 of the second rock friction plate 52 rotatably about a pin fitted to any one of the first rock friction plate 51 and the second rock friction plate 52. Moreover, a 4-plate configuration may also be available.

Second Embodiment

Figure 8:
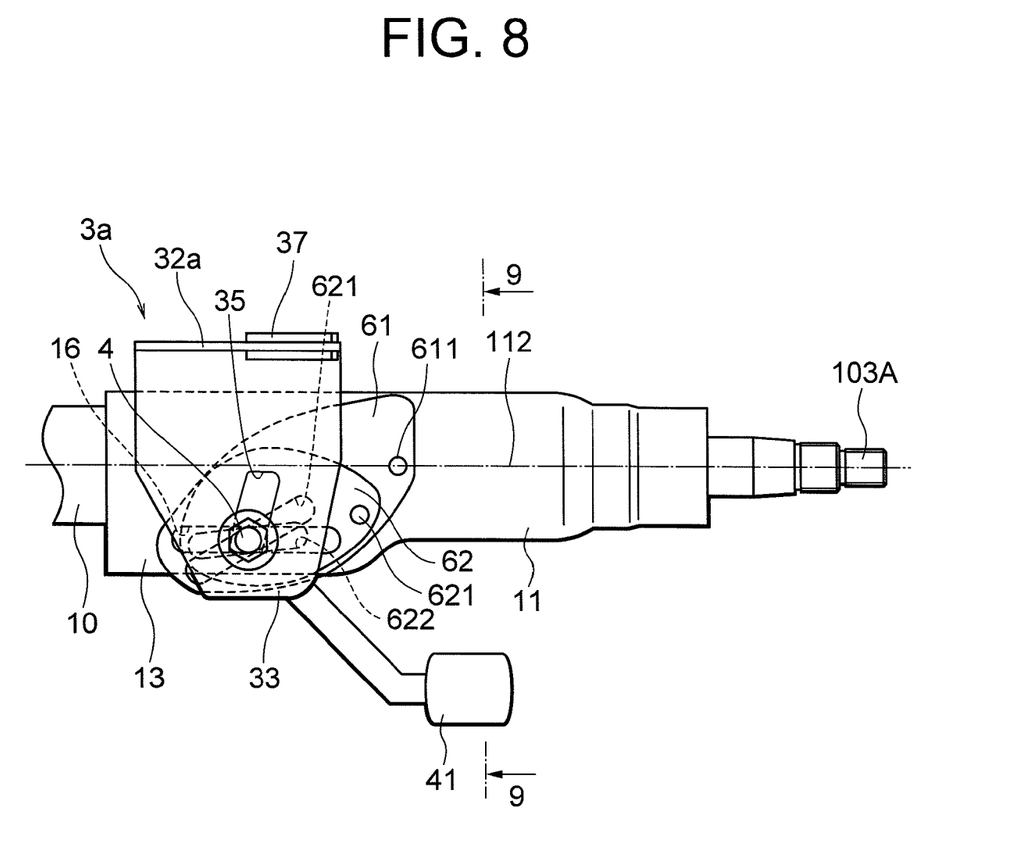
FIG. 8 is a side view illustrating a principal portion of the steering apparatus according to a second embodiment of the present invention.
Figure 9:
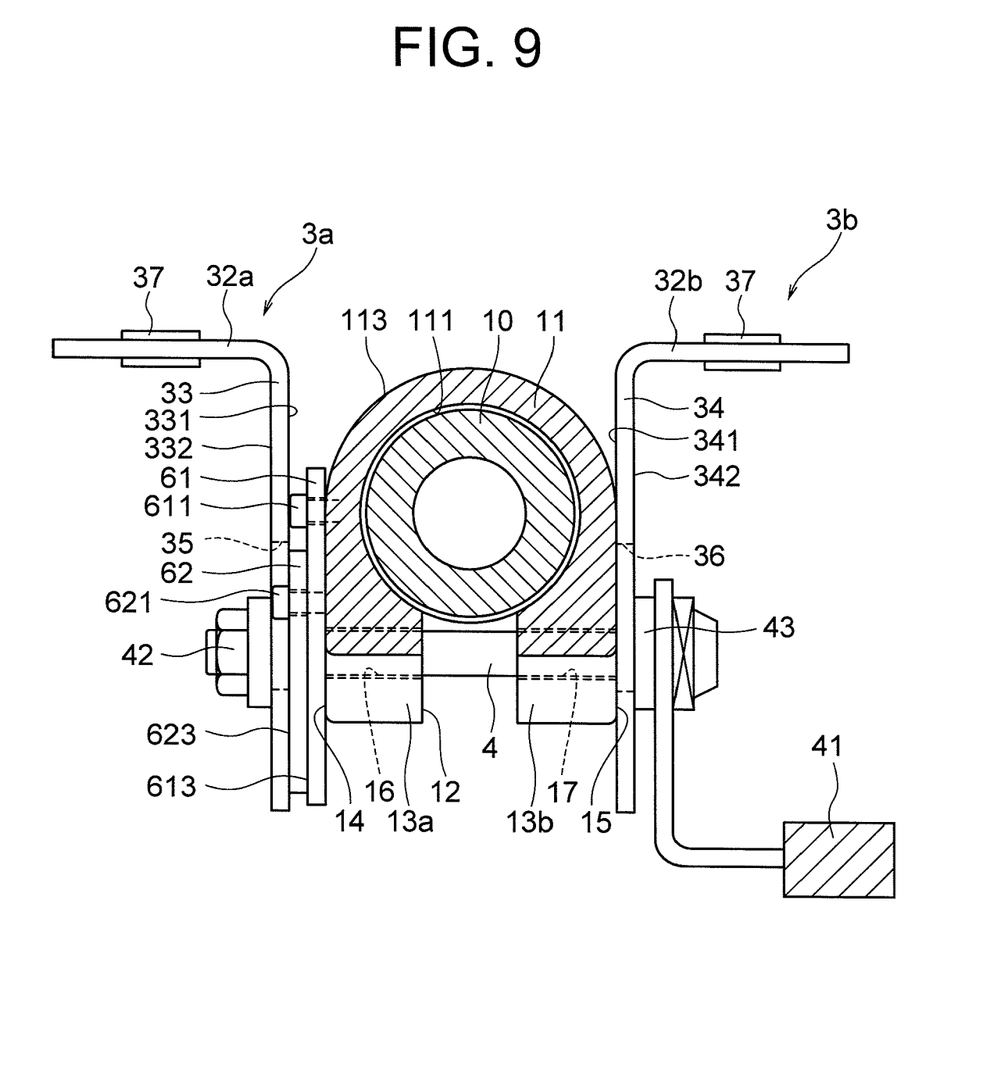
FIG. 9 is a sectional view taken along the 9-9 line depicted in FIG. 8.

Next, a second embodiment of the present invention will hereinafter be described. FIG. 8 is a side view illustrating a principal portion of the steering apparatus according to the second embodiment of the present invention, and FIG. 9 is a sectional view taken along the 9-9 line depicted in FIG. 8. The following discussion will be focused on different structural portions from those in the first embodiment, while the repetitive explanations are partially omitted. Further, the same components as those in the first embodiment will be described by marking those components with the same numerals. The second embodiment is an example of fitting the first rock friction plate and the second rock friction plate each rocking in a way that follows up the movement of the outer column 11 in the telescopic direction.

As shown in FIGS. 8 and 9, the tilt adjustment elongate grooves 35, 36 is formed through the side plates 33, 34 of the vehicle body fitting brackets 3a, 3b in the vehicle widthwise direction. The tilt adjustment elongate grooves 35, 36 extend in the circular arc shapes with unillustrated pivotal pins being centered, which support the front side of the inner column 10. Note that in the present invention, a steering apparatus may be configured, which is capable of making only the adjustment in the telescopic direction by forming round through holes in the vehicle widthwise direction as substitutes for the tilt adjustment elongate grooves 35, 36.

Through distance brackets 13a, 13b are formed the telescopic adjustment elongate grooves 16, 17 extending in parallel with the central axial line 112 of the outer column 11 on the lower side than the inner column 10. The fastening rod 4 taking the round-bar shape is inserted through the tilt adjustment elongate grooves 35, 36 and the telescopic adjustment elongate grooves 16, 17 from the right side in FIG. 9.

A first rock friction plate 61 is so supported rotatably by a pin 611 fixed to the outer column 11 on the side face 14 of the outer column 11. Further, a second rock friction plate 62 is supported rotatably by a pin 621 fixed to the first rock friction plate 61 on an external face 613 of the first rock friction plate 61. The first rock friction plate 61 and the second rock friction plate 62 are sandwiched in between the side plate 33 of the vehicle body fitting bracket 3a and the distance bracket 13a, and an external face 623 of the second rock friction plate 62 abuts an internal face 331 of the side plate 33.

The first rock friction plate 61 is a thin plate taking substantially a rounded substantially hexagonal shape and includes a third elongate groove 612 inclined slightly counterclockwise with respect to a straight line connecting the pin 611 to the fastening rod 4. The third elongate groove 612 may be further inclined with respect to the straight line connecting the pin 611 to the fastening rod 4 and may also be formed long along the straight line connecting the pin 611 to the fastening rod 4. The second rock friction plate 62 is a thin plate, which is smaller than the first rock friction plate 61 and takes substantially a rounded substantially triangular shape, includes a fourth elongate groove 622 inclined backward with respect to a straight line connecting the pin 621 to the fastening rod 4. The fourth elongate groove 622 may be formed long along the straight line connecting the pin 621 to the fastening rod 4. The third elongate groove 612 and the fourth elongate groove 622 may each take the circular arc shape without being limited to the linear shape. The fastening rod 4 is inserted into the third elongate groove 612 and the fourth elongate groove 622. A female screw formed in the inner diametrical portion of the nut 42 is screwed to a male screw formed at the left end of the fastening rod 4 illustrated in FIG. 9, and the right end face of the nut 42 abuts on the external face 332 of the side plate 33.

In the state where the fastening of the fastening rod 4 has been released, when the driver rotates the operation lever 41 in the fastening direction, the side plate 33 on the left side is pressed by the nut 42 pulled by the fastening rod 4 and gets deformed inward, and the internal face 331 of the side plate 33 presses the side face 14 of the distance bracket 13a through the second rock friction plate 62 and the first rock friction plate 61. Simultaneously with this, the side plate 34 on the right side, which is pressed by the cam 43, gets deformed inward, and the internal face 341 of the side plate 34 presses the side face 15 of the distance bracket 13b. According to the second embodiment, the number of friction faces is increased by the first rock friction plate 61 and the second rock friction plate 62, and there rise the frictional forces counteracting the impact force when the secondary collision occurs, whereby the outer column 11 is firmly fixed to the vehicle body fitting brackets 3a, 3b.

Next, in the state where the side plates 33, 34 etc are fastened by the fastening rod 4, when the driver rotates the operation lever 41 in such a direction as to release the fastening, the side plates 33, 34 of the vehicle body fitting brackets 3a, 3b resiliently return toward the outside, respectively. With this operation, the outer column 11 comes to a state of not being fixed to the vehicle body fitting brackets 3a, 3b, thereby enabling the driver to make the tilt adjustment of the steering wheel 102.

The driver moves the steering wheel 102 in the tilt adjusting direction, at which time, with this movement, the first rock friction plate 61, the second rock friction plate 62 and the fastening rod 4 together move in the tilt adjusting direction.

In the state where the fastening is released the driver can make also the telescopic adjustment of the steering wheel 102.

For example, when moving the outer column 11 shown in FIG. 8 to the left side, the first rock friction plate 61, of which the elongate hole 612 is pushed by the fastening rod 4, rotates counterclockwise, and, with this rotating, the pin 621 rotates counterclockwise about the pin 611, whereby the second rock friction plate 62 rotates.

Moreover, when moving the outer column 11 shown in FIG. 8 to the right side, the rock friction plate 61, of which the fourth elongate hole 622 is pushed by the fastening rod 4, rotates clockwise, and, with this rotating, the pin 621 rotates clockwise about the pin 611, whereby the second rock friction plate 62 rotates. Owing to this operation, the first rock friction plate 61 and the second rock friction plate 62 can move without interference with the fastening rod 4, and the outer column 11 can move without being hindered by the fastening rod 4.

In case the vehicle traveling forward collides with another vehicle etc, its inertia force causes the driver to collide with the steering wheel 102, and the impact force acts on the outer column 11 via the steering shaft. This impact force is transferred to the bracket 3b by dint of the frictional force on the contact face between the internal face 341 of the side plate 34 and the distance bracket 13b. Moreover, according to the configuration in the second embodiment, the impact force acting on the outer column 11 is transferred to the first rock friction plate 61 and the second rock friction plate 62 via the pins 611, 622 and further transferred to the bracket 32a by dint of the frictional force, and, while on the other hand, the impact force acting forward is transferred to the fastening bolt (rod) 4 from the third elongate hole 612 and the fourth elongate hole 622 and further transferred to the brackets 32a, 32b from the fastening bolt (rod) 4. The first rock friction plate 61 and the second rock friction plate 62 act against a counterforce from the fastening rod 4 by dint of the frictional forces on both surfaces of each plate 61,62, respectively. Still further, if the strong impact force is applied toward the front, flexures of the first rock friction plate 61 and the second rock friction plate 62 each built up by the thin plate are caused by the loads from the pins 611, 622 and the counterforce from the fastening rod 4, consequently a force to expand a gap between the side plate 33 and the distance bracket 14 is produced, and hence an axial force of the fastening rod 4 increases, thereby strengthening the fixation. Thus, in the steering apparatus according to the second embodiment, the outer column 11 is firmly fixed to the vehicle body fitting brackets 3a, 3b.

It is thereby feasible to prevent the outer column 11 from moving relatively to the vehicle body fitting brackets 3a, 3b by dint of the impact force acting toward the front side when the secondary collision occurs. As a result, the vehicle body fitting brackets 3a, 3b are removed from the vehicle body with the predetermined collapse load, whereby the impact absorbing performance is stabilized and the impact exerted on the driver when the secondary collision occurs can be reduced. Furthermore, there is no necessity of interposing the washers among the first rock friction plate 61, the second rock friction plate 62 and the vehicle body fitting brackets 3a, 3b, so that it is possible to decrease the dimension of the steering apparatus in the vehicle widthwise direction and the number of components thereof, and the weight of the steering apparatus decreases, which contribute to the reduction in manufacturing cost, the improvement of the fuel consumption of the vehicle and the improvement of the traveling performance of the vehicle.

The first rock friction plate 61 and the second rock friction plate 62 may also be provided between the side plate 34 of the vehicle body fitting bracket 3b and the distance bracket 13b. Further, the first rock friction plate 61 and the second rock friction plate 62 may also be provided both between the side plate 33 of the vehicle body fitting bracket 3a and the distance bracket 13a and between the side plate 34 of the vehicle body fitting bracket 3b and the distance bracket 13b.

The second embodiment involves taking the 2-plate configuration of the first rock friction plate 61 and the second rock friction plate 62, however, the present invention may take the 3-plate configuration that the third rock friction plate is disposed on the external face 623 of the second rock friction plate 62 and supported on the first rock friction plate 61 or the second rock friction plate 62 through a third rock supporting portion rotatably. Moreover, a configuration including 4 or more plates may also be available.

Moreover, in the present invention, both of the first and second rock friction plates 51, 52 exemplified in the first embodiment and the first and second rock friction plates 61, 62 exemplified in the second embodiment may be mounted in the steering apparatus. With this configuration, the outer column 11 can be fixed more firmly. Further, the three plates, i.e., the first and second rock friction plates 51, 52 exemplified in the first embodiment and the first rock friction plate 61 exemplified in the second embodiment may be mounted in the steering apparatus, and another three plates, i.e., the first and second rock friction plates 61, 62 exemplified in the second embodiment and the first rock friction plate 51 exemplified in the first embodiment may also be mounted in the steering apparatus.

The first and second embodiments have discussed the steering apparatus in which the inner column 10 is disposed on the front side, while the outer column 11 is disposed on the rear side, however, the rock friction plates may be applied to a steering apparatus in which the inner column 10 is disposed on the rear side, while the outer column 11 is disposed on the front side. Furthermore, in order to augment the frictional forces of the first and second rock friction plates 51, 52 exemplified in the first embodiment and the first and second rock friction plates 61, 62 exemplified in the second embodiment, the surfaces of these rock friction plates may be formed with filing-rugged portions and may also undergo coating or plating that exhibit a large coefficient of friction. It is preferable for augmenting the frictional forces of the rock friction plates that the outer column and the vehicle body fitting bracket are composed of materials having different degrees of hardness such as soft iron and aluminum.

What is claimed is:

1. A steering apparatus comprising:
    a column supported in the way of being enabled to make a tilt adjustment and supporting a steering shaft rotatably;
    a vehicle body fitting bracket having a pair of side plates disposed to sandwich said column in therebetween from both sides in a vehicle widthwise direction;
    a first rock friction plate brought into surface-contact with one of said side plates and supported by said one side plate rotatably about a rotation center provided on said one side plate in a rockable manner; and
    a second rock friction plate brought into surface-contact with said first rock friction plate and supported by said first rock friction plate rotatably about a fixed rotation center provided on said first rock friction plate,
    wherein said column is formed with a through-hole in the vehicle widthwise direction,
    said one side plate is formed with a tilt adjustment elongate groove extending in a tilt adjusting direction in a way that corresponds to said through-hole,
    said first rock friction plate is formed with a first elongate groove corresponding to said through-hole,
    said second rock friction plate is formed with a second elongate groove corresponding to said through-hole,
    a fastening rod is provided, which is inserted through said through-hole, said tilt adjustment elongate groove, said first elongate groove and said second elongate groove and fastens said column, said pair of side plates, said first rock friction plate and said second rock friction plate, and
    said first rock friction plate and said second rock friction plate rock to allow said fastening rod to move when the fastening of said fastening rod is released to make the tilt adjustment.

2. The steering apparatus according to claim 1, wherein said column is supported in the way of being enabled to make a telescopic adjustment,
    said through-hole is formed long in a telescopic direction,
    a third rock friction plate is provided, which is brought into surface-contact with said one side plate and said column between said one side plate and said column and is supported by said column rotatably, said third rock friction plate is formed with a third elongate groove corresponding to said through-hole,
said fastening rod is inserted through said third elongate groove,
said third rock friction plate is fastened by said fastening rod together with said column, said pair of side plates, said first rock friction plate and said second rock friction plate, and
said third rock friction plate rocks to avoid interference with said fastening rod when the fastening of said fastening rod is released to make the telescopic adjustment.

3. A steering apparatus comprising:
a column supported in the way of being enabled to make a telescopic adjustment and supporting a steering shaft rotatably;
a vehicle body fitting bracket having a pair of side plates disposed to sandwich said column in therebetween from both sides in a vehicle widthwise direction;
a first rock friction plate brought into surface-contact with said column between one of said side plates and said column and supported by said column rotatably about a rotation center provided on said column in a rockable manner; and
a second rock friction plate brought into surface-contact with said first rock friction plate and said one side plate between said first rock friction plate and said one side plate and supported by said first rock friction plate rockably about a rotation center provided on said first rock friction plate,
wherein said column is formed with elongate holes in the vehicle widthwise direction, said elongate holes are extend in a telescopic adjustment direction,
said pair of side plates is formed with through-holes corresponding to said elongate holes, respectively,
said first rock friction plate is formed with a first elongate groove corresponding to said elongate holes,
said second rock friction plate is formed with a second elongate groove corresponding to said elongate holes,
a fastening rod is provided, which is inserted through said elongate holes, said through-holes, said first elongate groove and said second elongate groove and fastens said column, said pair of side plates, said first rock friction plate and said second rock friction plate, and
said first rock friction plate and said second rock friction plate make rocking movements, respectively, to avoid interference with said fastening rod when the fastening of said fastening rod is released to make the telescopic adjustment.

4. The steering apparatus according to claim 3, wherein said column is supported in the way of being enabled to make the tilt adjustment,
said through-holes extend in the tilt adjusting direction,
a third rock friction plate is provided, which is brought into surface-contact with said one side plate and supported by said one side plate in the rockable manner,
a fourth rock friction plate is provided, which is brought into surface-contact with said third rock friction plate and supported by said third rock friction plate in the rockable manner,
said third rock friction plate is formed with a third elongate groove corresponding to said through-holes,
said fourth rock friction plate is formed with a fourth elongate groove corresponding to said through-holes,
said fastening rod is inserted through said third elongate groove and said fourth elongate groove,
said third rock friction plate and said fourth rock friction plate are fastened by said fastening rod together with said column, said pair of side plates, said first rock friction plate and said second rock friction plate, and
said third rock friction plate and said fourth rock friction plate make a rocking movement to avoid interference with said fastening rod when the fastening of said fastening rod is released to make the tilt adjustment.

5. The steering apparatus according to claim 3, wherein said column is supported in the way of being enabled to make the tilt adjustment,
said through-holes extend in the tilt adjusting direction,
a third rock friction plate is provided, which is brought into surface-contact with said one side plate and supported by said one, side plate in the rockable manner,
said third rock friction plate is formed with a third elongate groove corresponding to said through-holes,
said fastening rod is inserted through said third elongate groove,
said third rock friction plate is fastened by said fastening rod together with said column, said pair of side plates, said first rock friction plate and said second rock friction plate, and
said third rock friction plate makes a rocking movement to allow said fastening rod to move when the fastening of said fastening rod is released to make the tilt adjustment.

* * * * *